United States Patent
Runcie

(10) Patent No.: US 8,275,106 B1
(45) Date of Patent: Sep. 25, 2012

(54) METHOD AND APPARATUS FOR SEAMLESS SUBCONFERENCE MANAGEMENT

(75) Inventor: Peter Donald Runcie, Bilgola Plateau (AU)

(73) Assignee: Avaya Inc., Basking Ridge, NJ (US)

( * ) Notice: Subject to any disclaimer, the term of this patent is extended or adjusted under 35 U.S.C. 154(b) by 1422 days.

(21) Appl. No.: 11/652,464

(22) Filed: Jan. 11, 2007

(51) Int. Cl.
*H04M 3/42* (2006.01)

(52) U.S. Cl. ............ 379/202.01; 370/260; 370/261; 379/203.01

(58) Field of Classification Search ............ 379/202.01, 379/203.01; 370/260, 261
See application file for complete search history.

(56) References Cited

U.S. PATENT DOCUMENTS

| | | | | |
|---|---|---|---|---|
| 6,088,435 A | * | 7/2000 | Barber et al. | 379/205.01 |
| 2004/0170265 A1 | * | 9/2004 | Benco et al. | 379/202.01 |
| 2007/0203980 A1 | * | 8/2007 | Andersen | 709/204 |
| 2007/0299710 A1 | * | 12/2007 | Haveliwala | 705/8 |
| 2011/0261940 A1 | * | 10/2011 | Burt | 379/158 |

\* cited by examiner

*Primary Examiner* — Ahmad Matar
*Assistant Examiner* — Jirapon Intavong
(74) *Attorney, Agent, or Firm* — John C. Moran

(57) ABSTRACT

A method and apparatus manage conference calls by receiving for each of participants a participant access code to identify a subconference call to which each of participants is assigned; forming a conference call of all participants; initiating subconference calls by a host of the conference call; transferring each of the participants into a subconference call identified by the participant access code of each of the participants; re-initiating the conference call by the host; and re-forming all of the participants back into the conference call.

14 Claims, 6 Drawing Sheets

METHOD AND APPARATUS FOR SEAMLESS SUBCONFERENCE MANAGEMENT

TECHNICAL FIELD

This invention relates to the management of conferences.

BACKGROUND

Within the prior art, it is well known for individuals to communicate information by having a group of participants within a conference. The conference may be an audio only conference or may include video and audio. In addition, the conference may be communicated over the telecommunication system or via the Internet. Also, the conference may be text only in which the participants communicate their information by transmitting text to other participants. In multimedia conferences, some combination of these media types is used. Often in a conference, it becomes desirable for the participants to break into smaller groups to discuss a particular issue. The smaller groups are referred to as subconferences. It is known in the prior art that the host can manually set up these subconferences. (The host is a participant who is controlling the conference.) Although such a manual operation for creating subconferences does work, it is time consuming and prone to mistakes.

SUMMARY

A method and apparatus manage conference calls by receiving for each of participants a participant access code to identify a subconference call to which each of participants is assigned; forming a conference call of all participants; initiating subconference calls by a host of the conference call; transferring each of the participants into a subconference call identified by the participant access code of each of the participants; re-initiating the conference call by the host; and re-forming all of the participants back into the conference call.

DETAILED DESCRIPTION

Figure 1:
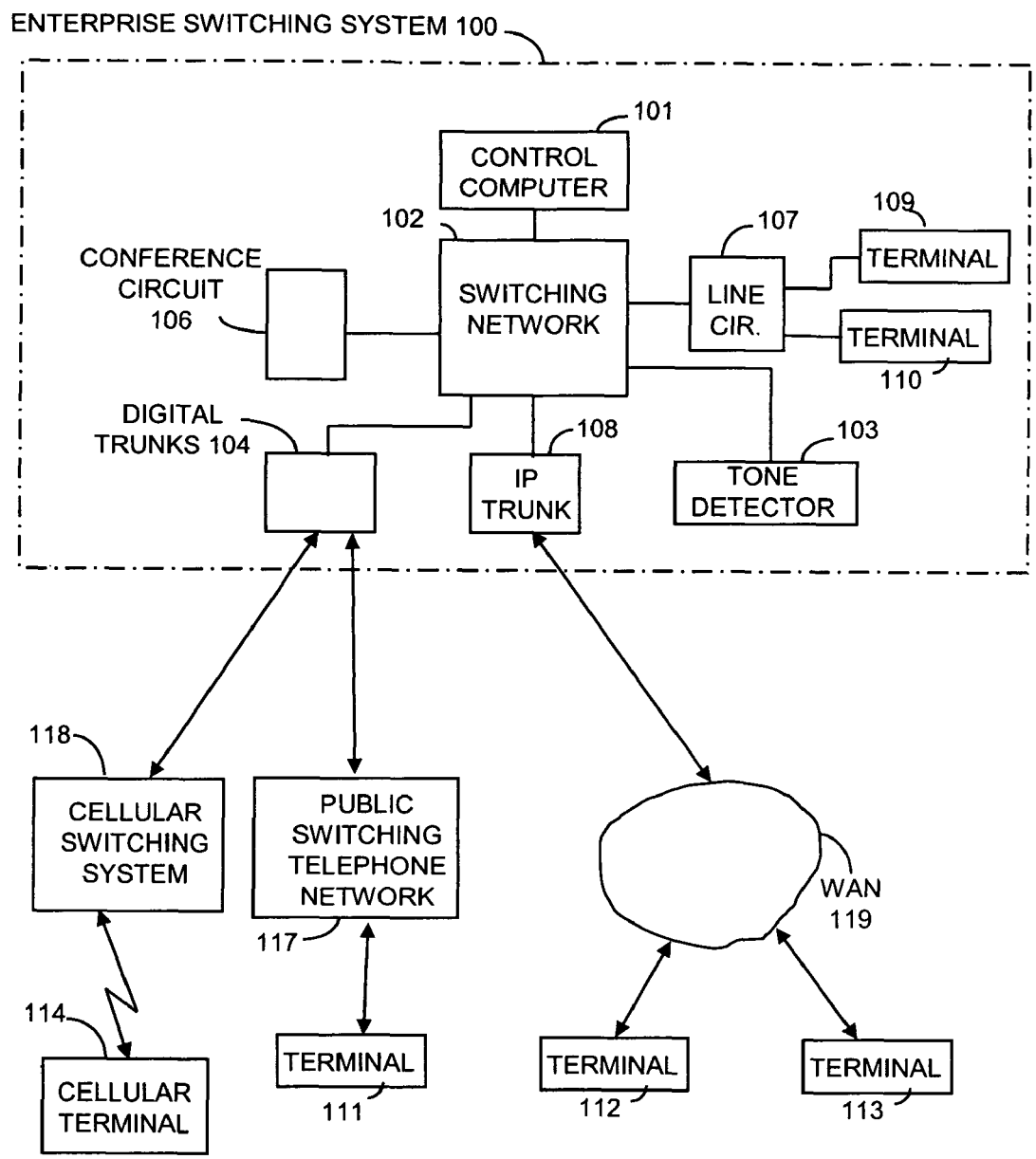
FIG. 1 illustrates an embodiment of a system.

FIG. 1 illustrates an embodiment. Enterprise switching system 100 is providing services for terminals 109-110. In addition, enterprise switching system 100 is providing conference operations for cellular switching system 118 via digital trunk 104 and for terminals 112-113 via WAN 120 and IP trunk 114. Enterprise switching system 100 is controlled by control computer 101. Switching network 102 provides communication of audio information among the elements 104, 106, 108, 107, and 103. In addition, switching network 102 provides control communication for control computer 101 to the various elements of enterprise switching system 100.

Within Enterprise switching system 100, control computer 101 provides conferencing for terminals 109-114 or some subset of these terminals using conference circuit 106. Terminals 109-114 may provide various media types for their users to participate in conferences as is well known by those skilled in the art. One terminal is used by the host who controls a conference. As is well known in the art, from time to time, participants may also take turns being the host. When the host decides, a conference will be split into subconferences with each subconference having a subset of the participants of the conference. The host can indicate this decision by utilizing a keyboard on the host terminal, by a spoken command, a button on the terminal, or by utilizing multi-frequency dialing tones or by other mechanisms well known to those skilled in the art that can be envisioned for providing such an indication from a terminal. Each participant has an access code which determines in which subconference they will become active.

In one embodiment, each participant enters their access code when they join the conference. The access code may have been distributed by e-mail or other mechanisms before the conference started.

In another embodiment, each participant is assigned an access code based on the organization of which they are part. In this embodiment, control computer 101 maintains the access codes for the organizations and a list to which organization each participant belongs. For example, within a corporation or university, such information is generally available to an Enterprise switching system. In addition to organizations, other groupings of participants could be used to determine access codes.

In another embodiment, during the conference and when the host determines that the subconferences should be started, each participant will enter their access code. In addition, the host may determine another time when each participant should enter their access code.

Figure 2:
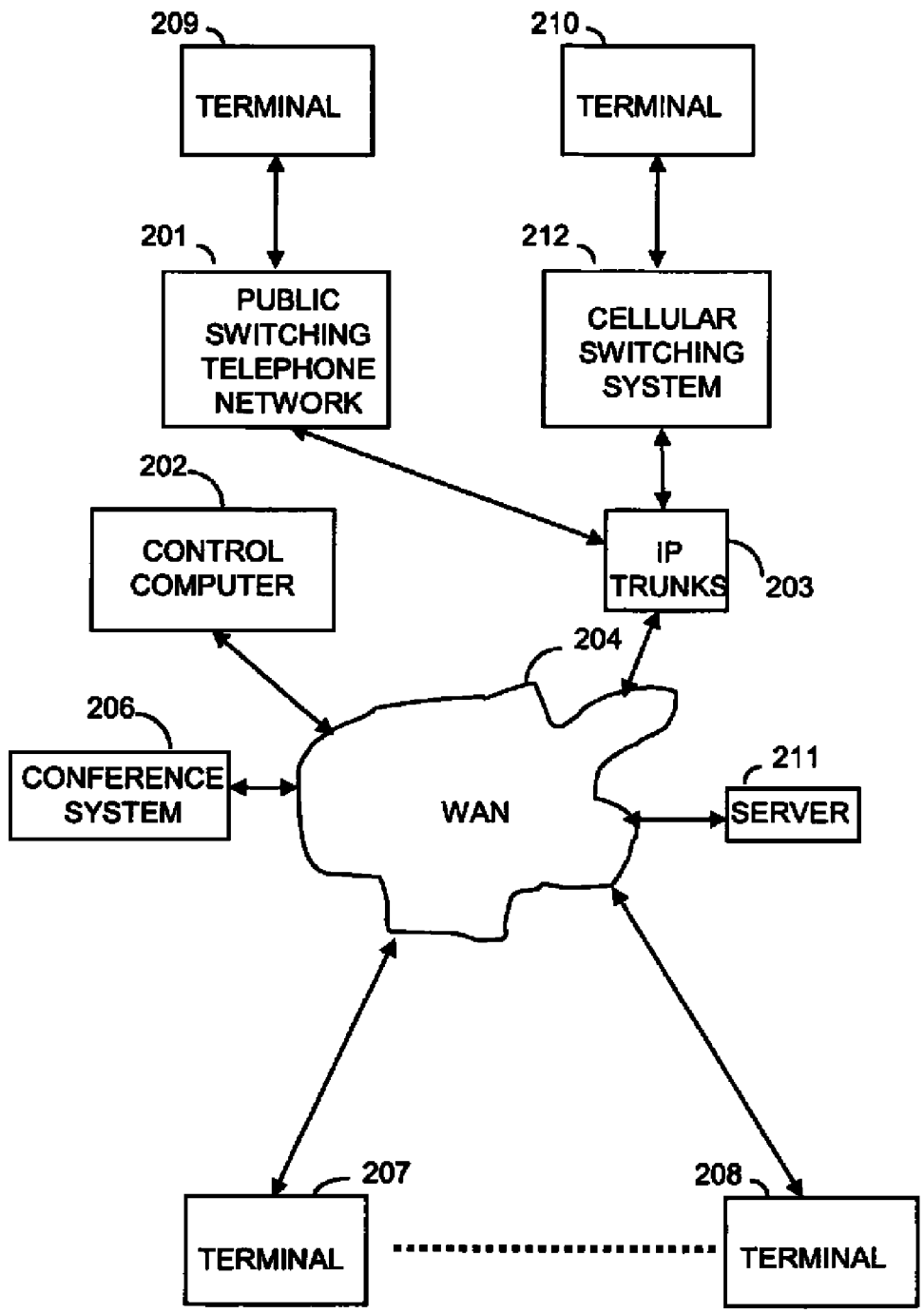
FIG. 2 illustrates another embodiment of a system.

FIG. 2 illustrates a second system. Control computer 202 controls the operations of conference system 206 and terminals 207-208 via WAN 204. Telephone calls are communicated to public switching network 201 and cellular switching system 212 via IP trunks 203 from WAN 204.

Figure 3:
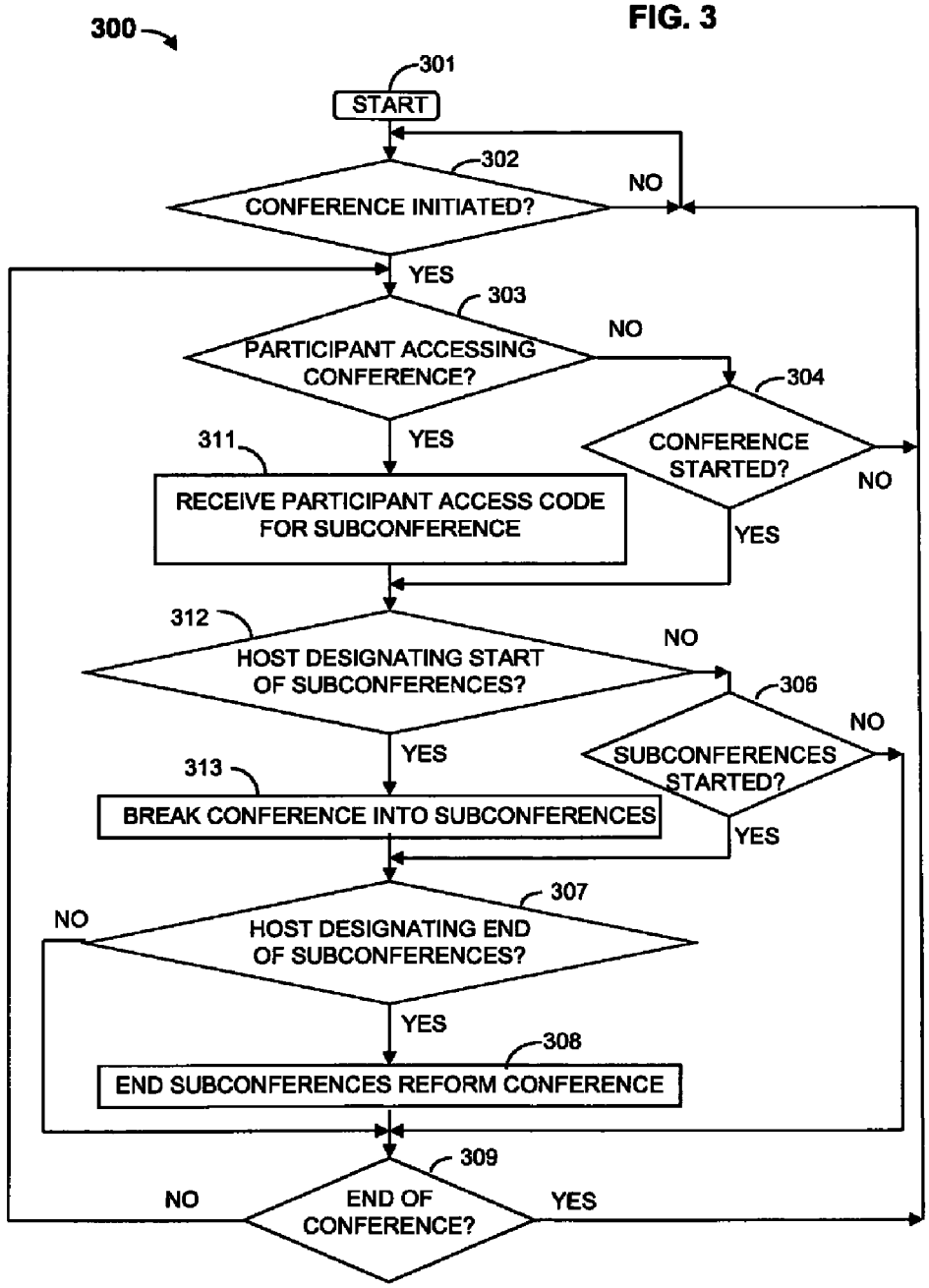
FIG. 3 illustrates, in flowchart form, an embodiment of system operations.

FIG. 3 illustrates, in flowchart form, operations 300. After being started in block 301, decision block 302 determines if a conference has been initiated. If the answer is no, control is returned back to decision block 302. If the answer is yes in decision block 302, control is transferred to decision block 303. The latter decision block determines if a participant to the conference is accessing the conference. If the answer is yes in decision block 303, block 311 receives the participant's access code which defines the subconference to which the participant has been previously assigned. This assigning of access codes may be done by e-mail or by other methods well known to those skilled in the art. Upon receiving the access code, the participant is added to the conference by block 311 before control is transferred to decision block 312. If the answer in decision block 303 is no, control is transferred to decision block 304 whose operations are discussed later.

Upon receiving control from block 311 or decision block 304 upon the result being yes, decision block 312 determines if the host is designating the start of the subconferences. If the answer is yes, block 313 breaks the conference into the subconferences based on the access code for each of the participants before transferring control to decision block 307. Participants are assigned to the subconferences corresponding to their access codes. If the answer in decision block 312 is no, control is transferred to decision block 306.

After execution of block 313 or decision block 306 resulting in a yes decision, decision block 307 determines if the host is designating the end of the subconferences. If the answer is no, control is transferred to decision block 309. If the answer is yes in decision block 307, control is transferred to block 308 which ends the subconferences and reforms the conference before transferring control to decision block 309. All participants rejoin the main conference.

Decision block 309 is responsive to receiving control (from block 308 or decision block 306 upon a no result) to determine if the conference has been ended by the host. If the answer is no, control is transferred back to decision block 303. If the answer is yes, control is transferred back to decision block 302.

Returning to decision block 303, if a result in decision block 303 is no, then control is transferred to decision block 304. Decision block 304 determines if the conference has been already started. If the answer is no in decision block 304, control is transferred back to decision block 302. If the answer in decision block 304 is yes, control is transferred to decision block 312 whose operations have already been explained.

Returning to decision block 312, if the answer in decision block 312 is no, control is transferred to decision block 306. Decision block 306 determines if the subconferences have already been started. If the answer is yes, control is transferred to decision block 307 whose operations have already been described. If the answer in decision block 306 is no, control is transferred to decision block 309 whose operations have already been described.

Figure 4:
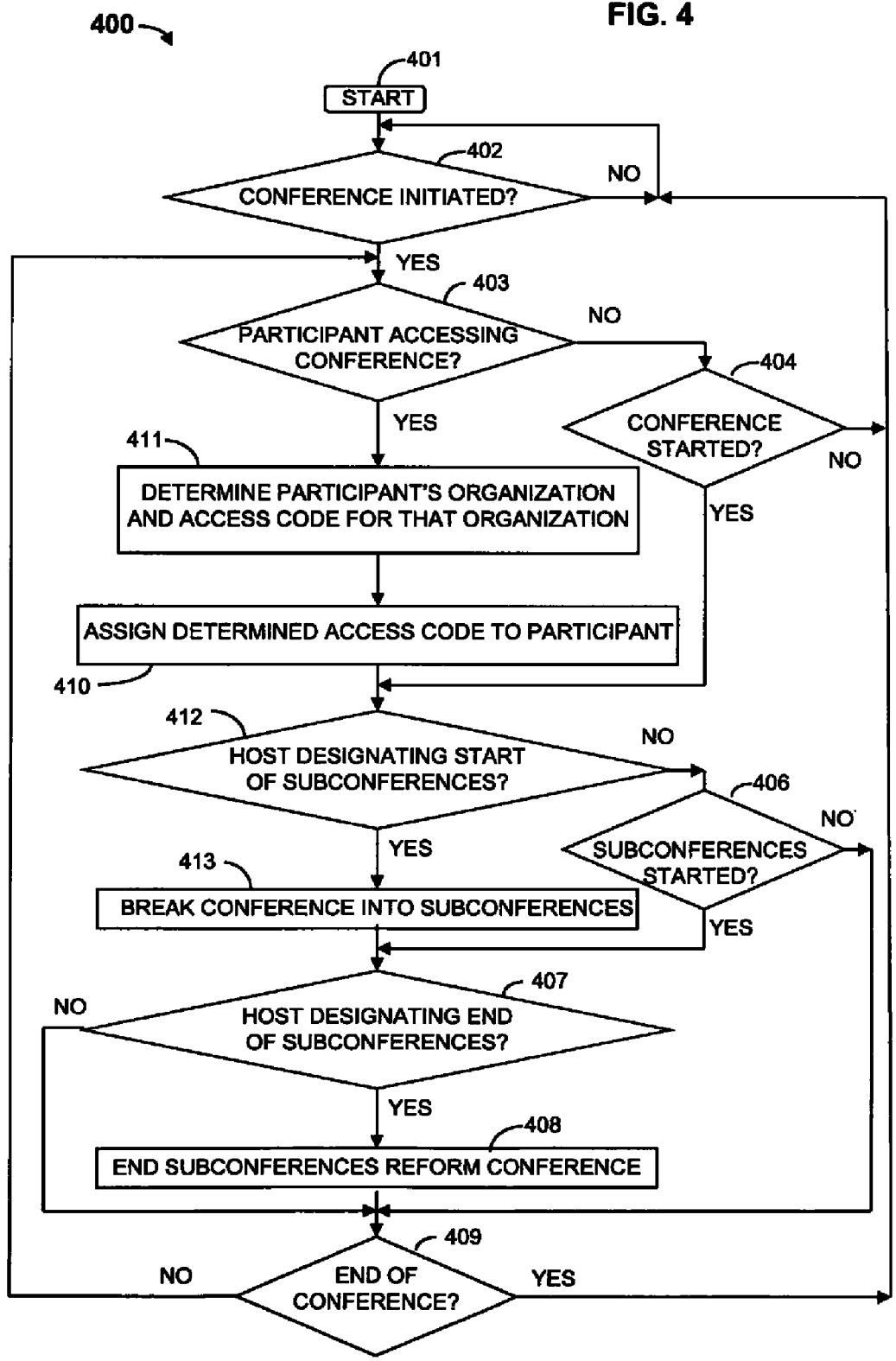
FIG. 4 illustrates, in flowchart form, another embodiment of systems operations.

FIG. 4 illustrates, in flowchart form, operations 400. In this embodiment, each participant's access code is assigned on the basis of the organization to which they belong. Blocks 401-409 and blocks 412-413 are identical in operation to blocks 301-309 and blocks 312-313 of FIG. 3. Blocks 411 and 410 function in the following manner: Upon receiving control from decision block 403, block 411 determines the participant's organization. This may be determined automatically for example by associating the participant's caller ID with an organizational identifier. After determining the participant's organization, block 411 determines the access code for that organization. These operations may be done utilizing well known lookup tables or accessing a database. Block 411 then transfers control to block 410. Block 410 assigns the determined access code to the participant before transferring control to decision block 412. Note, that decision block 412 receives control either from block 410 or from decision block 404 if the answer is yes.

Figure 5:
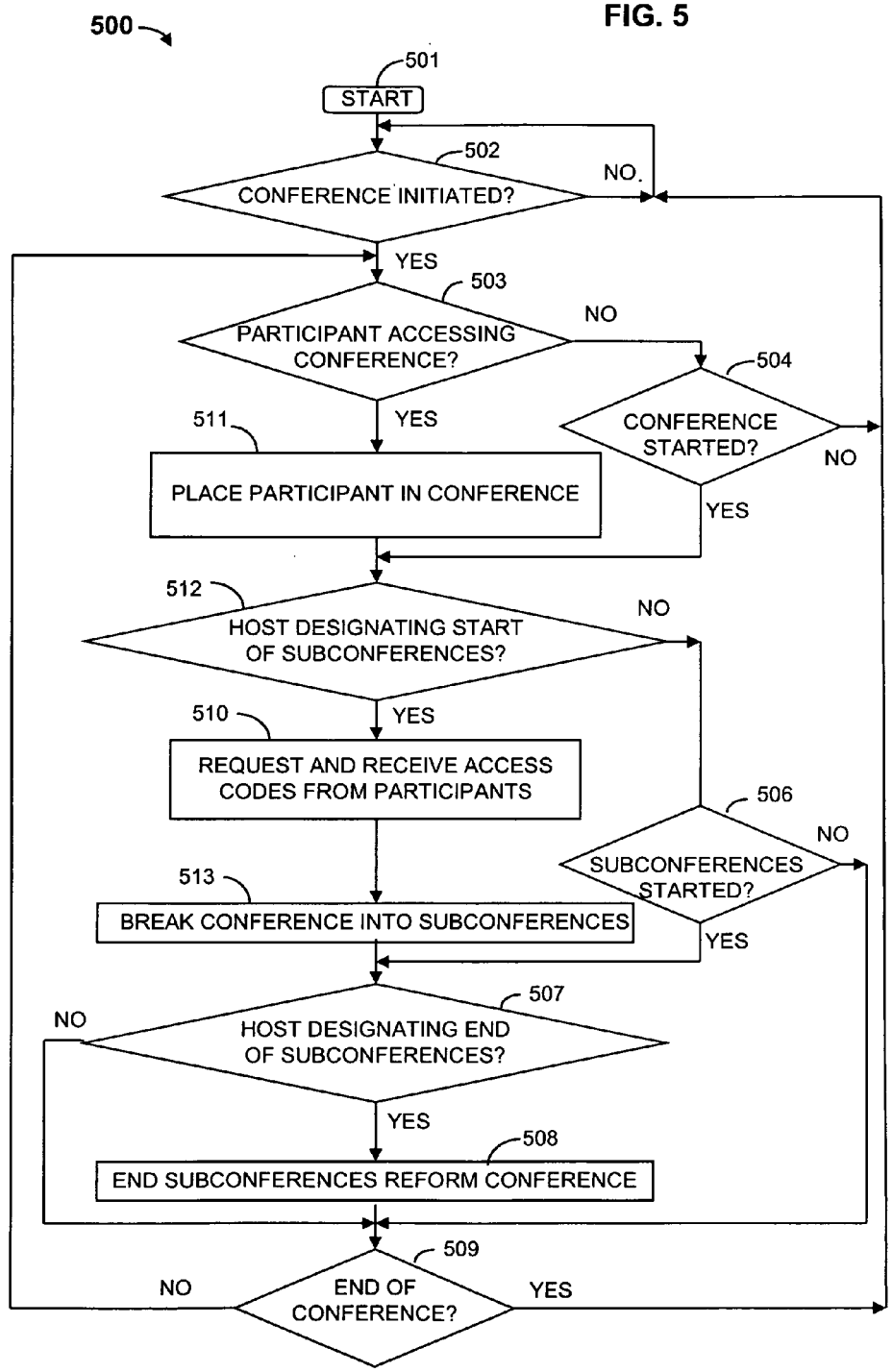
FIG. 5 illustrates, in flowchart form, another embodiment of systems operations.

FIG. 5 illustrates, in flowchart form, operations 500. In this embodiment, each participant's access code is received from the participant during the conference upon the decision of the host. Blocks 501-509 and blocks 512-513 are identical in operation to blocks 301-309 and blocks 312-313 of FIG. 3. Blocks 511 and 510 function in the following manner: Note, decision block 512 transfers control to block 510 not to block 513 as in FIG. 3 upon the decision being yes. Also, block 513 receives control from block 510 not from decision block 512. Consider now the operation of blocks 511 and 510. If the answer in decision block 503 is yes, block 511 places the participant in the conference. With respect to block 510, after receiving control from decision block 512, block 510 requests and receives access codes from all of the participants. After receiving the requested information, block 510 transfers control to block 513. Note, one skilled in the art may well envision that block 510 may be located in other parts of FIG. 5 so that the participants are requested to enter their access codes at other times then when the subconferences are started.

Figure 6:
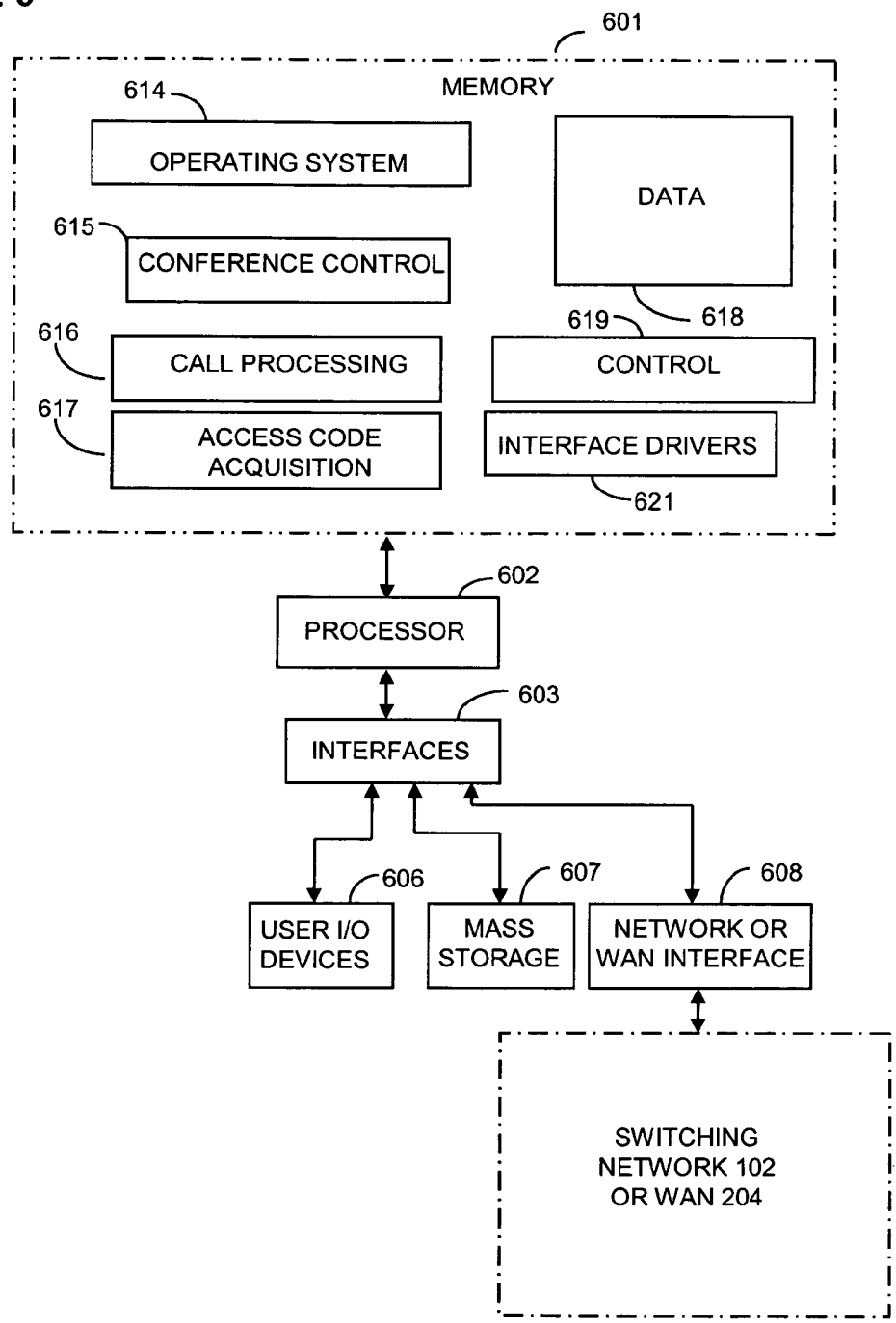
FIG. 6 illustrates, in block diagram form, a control computer for controlling a switching system or a IP switching system.

FIG. 6 illustrates, in block diagram form, one embodiment of a control computer of FIGS. 1 and 2. Processor 602 provides overall control of the control computer by execution of programs stored in memory 601 as well as data stored and retrieved from data 618. Note, a processor such as processor 602 is also referred to by those skilled in the art as a central processing unit or a computer. Operating system 614 performs overall control of processor 602. Call processing routine 616 controls the telecommunication operations. Control of the conference bridge is provided via control routine 619. Access code acquisition is performed by routine 617. Conference control is performed by routine 615. Interface drivers 621 provide the interface software for devices connected to processor 602 via interfaces 603. Conference control routine 615 and access code acquisition routine 617 may not be executed by processor 602 if these operations are performed by the conference circuit or system. Processor 602 communicates with participants' terminals and conference circuit or system via switching network and WAN interface 608.

When the operations of a computer, processor or server are implemented in software, it should be noted that the software can be stored on any computer-readable medium for use by or in connection with any computer related system or method. In the context of this document, a computer-readable medium is an electronic, magnetic, optical, or other physical device or means that can contain or store a computer program for use by or in connection with a computer related system or method. The computer, processor or server can be embodied in any computer-readable medium for use by or in connection with an instruction execution system, apparatus, or device such as a computer-based system, processor-containing system, or other system that can fetch the instructions from the instruction execution system, apparatus, or device and execute the instructions. In the context of this document, a "computer-readable medium" can be any means that can store the program for use by or in connection with the instruction execution system, apparatus, or device. For example, the computer-readable medium can be, but is not limited to, an electronic, magnetic, optical, electromagnetic, infrared, or semiconductor system, apparatus, or device. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), and a portable compact disc read-only memory (CDROM) (optical).

In an alternative embodiment, where the computer, processor or server is implemented in hardware, the telephone set, control computer or server can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Of course, various changes and modifications to the illustrated embodiments described above will be apparent to those skilled in the art. These changes and modifications can be made without departing from the spirit and scope of the invention and without diminishing its intending advantages. It is therefore intended that such changes and modifications be covered by the following claims except insofar as limited by the prior art.

What is claimed is:

1. A method for managing conference calls, comprising:
controlling a conference call by a control computer;
receiving by the control computer for each of participants as each of the participants enters the conference call a participant access code to identify a subconference call to which each of participants is assigned;
forming by the control computer the conference call of all participants;
initiating subconference calls by a single command from a host of the conference call;
transferring by the control computer each of the participants into a subconference call identified by the participant access code of each of the participants in response to the single command from the host;
re-initiating the conference call by the host; and
re-forming by the control computer all of the participants back into the conference call in response to re-initiation by the host.

2. The method of claim 1 wherein the receiving comprises manually entering by each participant the participant access code for each participant.

3. The method of claim 2 wherein the entering of the participant access code is done by the each participant upon each participant becoming part of the conference call.

4. The method of claim 2 wherein the entering of the participant access code is done by the each participant upon request by the host of the conference call.

5. The method of claim 1 wherein the receiving of the participant access code comprises accessing a database to determine the participant access code for each of the participants.

6. The method of claim 5 wherein the accessing comprises identifying at least one of an organization membership or group membership for each of the participants; and
determining the participant access code of each of the participants from the least one of an organization membership or group membership of each of the participants.

7. The method of claim 5 wherein the accessing comprises using caller identification information.

8. A non-transitory computer-readable medium for managing conference calls, comprising computer-executable instructions when executed:
receiving for each of participants as each of the participants enters a conference call a participant access code to identify a subconference call to which each of participants is assigned;
forming the conference call of all participants;
initiating subconference calls by a single command from a host of the conference call;
transferring by the control computer each of the participants into a subconference call identified by the participant access code of each of the participants in response to the single command from the host;
re-initiating the conference call by the host; and
re-forming all of the participants back into the conference call in response to re-initiation by the host.

9. The non-transitory computer-readable medium of claim 8 wherein the computer-executable instructions for receiving comprise computer-executable instructions when executed accepting the participant access code are responsive to manual entry by each participant of the participant access bode for each participant.

10. The non-transitory computer-readable medium of claim 9 wherein the computer-executable instructions when executed accepting the participant access code are responsive to actions by the each participant upon each participant becoming part of the conference call.

11. The non-transitory computer-readable medium of claim 9 wherein the computer-executable instructions when executed accepting the participant access code are responsive to actions by the each participant upon request by the host of the conference call.

12. The non-transitory computer-readable medium of claim 8 wherein the computer-executable instructions for receiving of the participant access code comprise computer-executable instructions when executed accessing a database to determine the participant access code for each of the participants.

13. The non-transitory computer-readable medium of claim 12 wherein the computer-executable instructions for accessing comprise computer-executable instructions when executed identifying at least one of an organization membership or group membership for each of the participants; and
determining the participant access code of each of the participants from the least one of an organization membership or group membership of each of the participants.

14. The non-transitory computer-readable medium of claim 12 wherein the computer-executable instructions for accessing comprise computer-executable instructions when executed using caller identification information.

* * * * *